US009069077B2

(12) United States Patent
Hartley et al.

(10) Patent No.: US 9,069,077 B2
(45) Date of Patent: Jun. 30, 2015

(54) TRAFFIC INFORMATION SERVICES-BROADCAST (TIS-B) TRAFFIC SNOOPING

(71) Applicant: Garmin International, Inc., Olathe, KS (US)

(72) Inventors: Timothy G. Hartley, Salem, OR (US); Christopher E. P. Schulte, Independence, OR (US)

(73) Assignee: Garmin Switzerland GmbH (CH)

( * ) Notice: Subject to any disclaimer, the term of this patent is extended or adjusted under 35 U.S.C. 154(b) by 449 days.

(21) Appl. No.: 13/739,656

(22) Filed: Jan. 11, 2013

(65) Prior Publication Data
US 2014/0197981 A1    Jul. 17, 2014

(51) Int. Cl.
*G01S 13/93*  (2006.01)
*G01S 13/76*  (2006.01)
*G08G 5/04*   (2006.01)
*G01S 13/74*  (2006.01)
*G01S 13/91*  (2006.01)
G01S 13/00    (2006.01)
G08G 5/00     (2006.01)

(52) U.S. Cl.
CPC *G01S 13/74* (2013.01); *G01S 13/91* (2013.01)

(58) Field of Classification Search
CPC .......... G01S 13/74; G01S 13/88; G01S 13/91
USPC ......... 342/29–52, 58, 60, 175, 195, 350, 385, 342/386, 407, 408; 340/945, 961; 701/1, 701/120, 121, 122, 400, 408, 468, 300, 301
See application file for complete search history.

(56) References Cited

U.S. PATENT DOCUMENTS

| 3,750,166 | A  | * | 7/1973 | Dearth | 342/30 |
|---|---|---|---|---|---|
| 4,197,538 | A  | * | 4/1980 | Stocker | 342/32 |
| 4,968,982 | A  | * | 11/1990 | Lopez | 342/408 |
| 5,138,321 | A  | * | 8/1992 | Hammer | 342/36 |
| 6,542,810 | B2 | * | 4/2003 | Lai | 340/945 |
| 6,545,631 | B2 | * | 4/2003 | Hudson et al. | 342/30 |
| 6,810,322 | B2 | * | 10/2004 | Lai | 340/945 |
| 7,043,355 | B2 | * | 5/2006 | Lai | 340/945 |
| 7,423,590 | B2 | * | 9/2008 | Smith | 342/32 |

(Continued)

OTHER PUBLICATIONS

U.S. Appl. No. 13/739,636, filed Jan. 11, 2013.

(Continued)

*Primary Examiner* — Bernarr Gregory
(74) *Attorney, Agent, or Firm* — Samuel M. Korte; Mohammad M. Ali

(57) ABSTRACT

An ADS-B system associated with an aircraft is configured to furnish an indication whether the aircraft is within coverage of air traffic information transmitted by an air traffic control ground station. The ADS-B system receives transmissions from an air traffic control ground station that include air traffic information and a client list comprising identification addresses of aircraft included in the air traffic information. The ADS-B system determines whether the aircraft is within a range of a second aircraft and whether the second aircraft is included in the air traffic information by comparing an identification address of the second aircraft with the identification addresses in the client list. The ADS-B system furnishes an indication that the aircraft is within coverage of the air traffic information when the second aircraft is included in the air traffic information and the aircraft is within the range of the second aircraft.

22 Claims, 5 Drawing Sheets

(56) References Cited

U.S. PATENT DOCUMENTS

| | | | |
|---|---|---|---|
| 7,495,612 B2* | 2/2009 | Smith | 342/32 |
| 7,714,744 B1* | 5/2010 | Wichgers | 340/945 |
| 7,747,360 B2* | 6/2010 | Canu-Chiesa et al. | 340/961 |
| 7,755,516 B2* | 7/2010 | Clark et al. | 340/961 |
| 7,755,532 B2* | 7/2010 | Dooley | 342/36 |
| 8,004,452 B2* | 8/2011 | Rolfe et al. | 342/37 |
| 8,063,816 B2* | 11/2011 | Troxel | 342/30 |
| 8,102,301 B2* | 1/2012 | Mosher | 342/36 |
| 2011/0148690 A1 | 6/2011 | Mosher | 342/30 |
| 2012/0038501 A1 | 2/2012 | Schulte et al. | 342/30 |

OTHER PUBLICATIONS www.flyadsb.com, published prior to Jan. 11, 2013.
ADS-B Wikipedia entry, published prior to Jan. 11, 2013.
ForeFlight Stratus, published prior to Jan. 11, 2013.

* cited by examiner

TRAFFIC INFORMATION SERVICES-BROADCAST (TIS-B) TRAFFIC SNOOPING

BACKGROUND

Automatic Dependent Surveillance-Broadcast (ADS-B) is a cooperative surveillance technique used for air traffic control and related applications. ADS-B-equipped aircraft determine their position using a Global Navigation Satellite System (GNSS) such as the United States Global Positioning System (GPS), or other position determining equipment. The determined position of the aircraft is then combined with other data and broadcast from the aircraft using an ADS-B transceiver (e.g., a transponder). The transmitted data may include the determined position, the type of aircraft, the speed of the aircraft, the aircraft's flight number, and whether the aircraft is turning, climbing, or descending. Other ADS-B transceivers integrated into the air traffic control (ATC) system or installed aboard other aircraft receive and use the broadcast information, which is periodically updated, to provide users with an accurate depiction of real-time aviation traffic, both in the air and on the ground.

ADS-B is comprised of two different services: ADS-B Out and ADS-B In. ADS-B Out relates to the periodic broadcast of information about the aircraft, such as identification, current position, altitude, and velocity, through an onboard transmitter. ADS-B In relates to the receipt of transmitted data, such as Traffic Information Services-Broadcast (TIS-B) data, Flight Information Services-Broadcast (FIS-B) data and direct communication from nearby aircraft. Ground traffic systems process received ADS-B transmission and other information to broadcast data related to aviation traffic. For example, an ATC system may broadcast TIS-B data, which includes aggregated ADS-B data received from aircraft transmitters, and additional information, such as FIS-B data, to enable broadcast recipients to have a comprehensive understanding of ground and air traffic. TIS-B broadcasts supplement ADS-B to provide additional situational awareness of all traffic known to the ATC system, including aircraft that are not transmitting ADS-B information.

SUMMARY

Techniques are described that allow a system, such an ADS-B system, to furnish an indication that an aircraft with which the system is associated or employed (hereinafter the "ownship" aircraft) is within coverage of air traffic information transmitted by an air traffic control (ATC) ground station. In one or more embodiments, the system includes a receiver assembly and a processing assembly. The receiver assembly is operable to receive transmissions broadcast from an air traffic control (ATC) ground station. The transmissions include air traffic information and a client list comprising identification addresses of aircraft included in the air traffic information. The processing system determines whether the ownship aircraft is within a range of a second aircraft, and whether the second aircraft is included in the air traffic information by comparing an identification address of the second aircraft with the identification addresses in the client list. The processing system causes an indication that the ownship aircraft is within coverage of the air traffic information transmitted by the air traffic control (ATC) ground station to be furnished when the second aircraft is included in the air traffic information and the ownship aircraft is within the range of the second aircraft.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
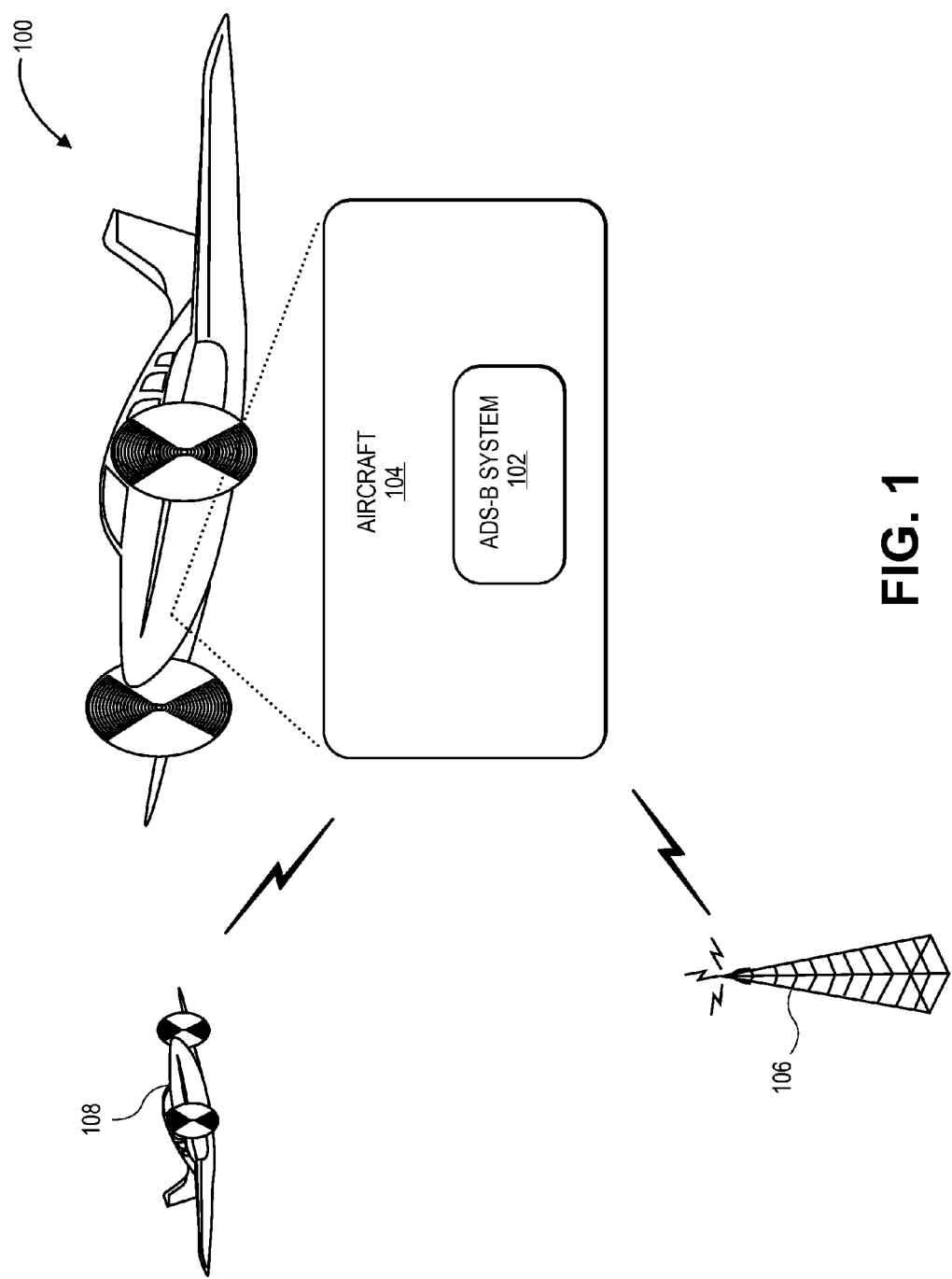
FIG. 1 is a diagrammatic illustration of an environment in an example embodiment that includes an aircraft that employs an ADS-B system to furnish an indication to the flight crew of the aircraft is within coverage of air traffic information transmitted by an air traffic control ground station.

Traffic Information Services-Broadcast (TIS-B) services broadcast by air traffic control (ATC) ground stations provide air traffic information to subscribing ADS-B-equipped aircraft (e.g., aircraft having ADS-B Out capability). The TIS-B air traffic information has a coverage area of fifteen nautical miles (15 NM) surrounding the participating aircraft and an altitude range of three thousand five hundred feet (3,500 ft) above and below the participating aircraft. However, TIS-B data does not furnish air traffic information to non-participating aircraft (e.g., aircraft that lack ADS-B Out capability, but may have ADS-B In capability). Consequently, the flight crew (e.g., the pilot, a co-pilot, etc.) of such aircraft may lack desirable air traffic information furnished by the ATC system to participating aircraft.

Accordingly, techniques are described that allow an ADS-B system, in particular, an ADS-B In system without ADS-B Out capability, to determine whether the aircraft in which the ADS-B system is employed is within coverage of air traffic information transmitted by an ATC ground station to participating aircraft. As described herein, an aircraft is considered within coverage of air traffic information, when the aircraft is within a volume of airspace for which air traffic information is furnished by the ATC system. For TIS-B air traffic information, this volume comprises a cylindrical volume having a radius of at least approximately fifteen nautical miles (15 NM) surrounding each participating aircraft and an altitude of at least approximately three thousand five hundred feet (3500 ft) altitude above and/or below each participating aircraft.

In one or more embodiments, an ADS-B system, which may be implemented as one or more portable ADS-B enabled devices, includes a receiver assembly and a processing system. The receiver assembly is operable to receive transmissions broadcast from an ATC ground station. The transmissions include air traffic information and a client list comprising identification addresses of aircraft included in the air traffic information. For example, in embodiments where ADS-B system is configured to receive TIS-B data from the ATC ground station, the receiver assembly may be configured to receive TIS-B air traffic information and a TIS-B service status list comprising International Civil Aviation Organization (ICAO) addresses of the aircraft included in the TIS-B air traffic information. The receiver assembly may further be operable to receive additional transmissions, such as Mode S, UAT or VDL Mode 4 squitter transmissions, broadcast by other aircraft which are ADS-B equipped. These transmissions include identification addresses, such as ICAO addresses, configured to identify the aircraft from which the transmission originated to at least one of an ATC ground station or another aircraft.

The processing system determines whether the ownship aircraft is within a range of a second aircraft. For example, the ADS-B system may employ a position determining system, which may include a global navigation satellite system (GNSS) receiver, to determine a position of the ownship aircraft. The processing system may compare the determined position of the ownship aircraft with a position of the second aircraft. In embodiments, the position of the second aircraft may be retrieved from TIS-B transmissions received from the ATC ground station, the Mode S transmissions received from transponders of the second aircraft, the UAT transmissions received from the ADS-B system of the second aircraft, and/or from other sources. The processing system further determines whether the second aircraft is included in the air traffic information broadcast by the ATC ground station by comparing an identification address of the second aircraft with the identification addresses in the client list. For example, in embodiments, the processing system may perform a search of the TIS-B service status list for the ICAO address of the second aircraft.

When the second aircraft is determined to be included in the air traffic information received from the ATC ground station, and the ownship aircraft is determined to be within the range of the second aircraft, the processing system causes an indication that the ownship aircraft is within coverage of the air traffic information transmitted by the ATC ground station to be furnished to the flight crew of the ownship aircraft. For example, the processing system may cause a deterministic status bit to be set in the ADS-B system indicating that air traffic coverage is available for the ownship aircraft, and/or may cause a display of the ADS-B system to furnish a graphical depiction of the air traffic coverage for the aircraft. For instance, the ADS-B system may include, or be paired with, a flight display operable to present various flight information such as air traffic information.

In the following discussion, an example aircraft environment in which an ADS-B system, such as a portable ASD-B-enabled device, may be employed in accordance with the present disclosure is first described. Example functionality is then described that may be implemented by the ADS-B system in the example environment to determine whether the aircraft in which the system is employed (the ownship aircraft) is included in air traffic information, such as TIS-B air traffic information, broadcast by an ATC ground station, in the example environment as well as in other environments without departing from the spirit and scope thereof.

Example Environment

FIG. 1 illustrates an environment 100 in an example embodiment in which an ADS-B system 102 is configured to furnish an indication that an aircraft 104, with which the ADS-B system 102 is associated (the "ownship" aircraft 104), is within coverage of air traffic information transmitted by an ATC ground station 106. In embodiments, the ADS-B system 102 may be configured to furnish ADS-B In service without corresponding ADS-B Out service, which makes it a non-participating aircraft for TIS-B data. In such embodiments, the ADS-B system 102 may be capable of receiving TIS-B data as well as other ADS-B data, such as FIS-B data, and so forth, broadcast by the ATC ground station 106. The ADS-B system 102 may further be capable of receiving direct communication from other aircraft 108 within the environment 100. For example, the ADS-B system 102 may be capable of receiving Mode A/C/S reply transmissions originating from another aircraft, such as aircraft 108, in response to interrogations by the ATC ground station 106, or other aircraft; receiving ADS-B data from an ADS-B Out capable, TIS-B data participating aircraft, such as aircraft 108, via an ADS-B data link (1090 ES, UAT, VDL Mode 4, etc.), and so forth.

In embodiments, the ADS-B system 102 may be implemented as one or more ADS-B-enabled portable electronic devices 200. For example, in FIG. 2A, the ADS-B system 102 illustrated comprises an ADS-B receiver 202 that is in communication with a portable (e.g., hand-held) electronic device 204, such as an aviation portable device, a tablet computer, a smartphone, and so forth, via an interface, which may be wired or wireless. In such embodiments, the ADS-B receiver 202 may be portable so that the ADS-B receiver 202 and the portable electronic device 204 can be carried by a member of the flight crew (e.g., a pilot or copilot) into the cockpit of the ownship aircraft 104 (FIG. 1) for use during operation of the ownship aircraft 104. However, it is contemplated that, in other embodiments, the ADS-B system 102 may comprise an avionic component installed within the aircraft. The portable electronic device 204 may implement one or more software applications or modules (e.g., one or more apps) configured to furnish aircraft related information (e.g., ADS-B information, weather information, navigation/flight plan information, aircraft performance information, and so forth) to the flight crew (e.g., the pilot, a copilot, etc.) of the ownship aircraft 104. In some configurations, the portable electronic device 204 may be integrated with the ADS-B receiver 202, or portions thereof.

Figure 2A:
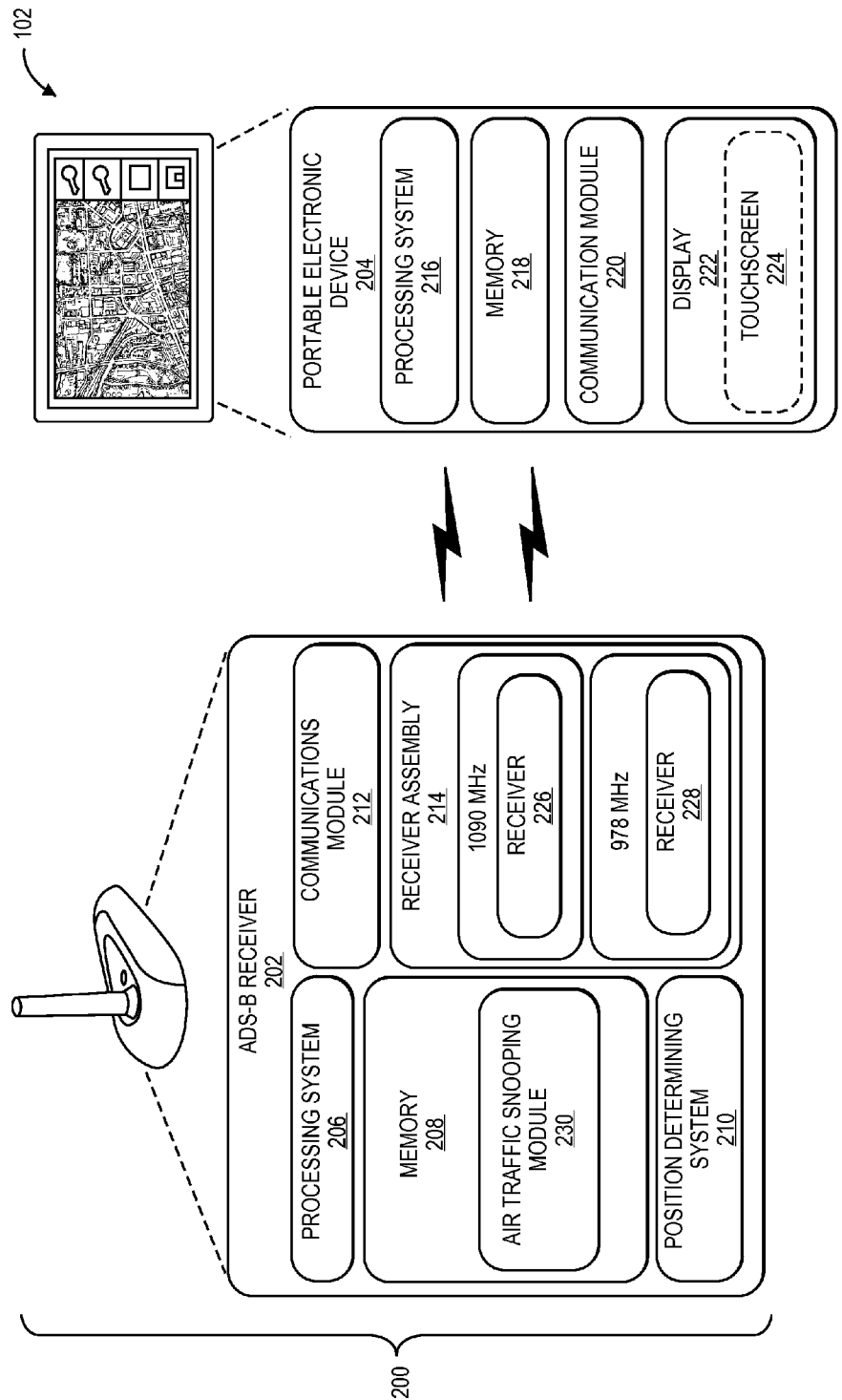
FIG. 2A is a diagrammatic illustration depicting an ADS-B system in an example implementation, wherein the ADS-B system is implemented by one or more ADS-B enabled electronic devices.

In FIG. 2A, the ADS-B receiver 202 illustrated includes a processing system 206, a memory 208, a position determining system 210, a communications module 212, and a receiver assembly 214. Similarly, the portable electronic device 204 illustrated includes a processing system 216, a memory 218, a communications module 220, and a display 222, which may include a touch screen 224. However, it should be noted that the ADS-B receiver 202 and the portable electronic device 204 are not limited to the specific embodiments illustrated. Thus, the ADS-B receiver 202 and/or the portable electronic device 204 may include additional components or fewer components depending on the design requirements of the specific ADS-B system implementation. For example, in some configurations, the electronic device 204 may be integrated with the ADS-B receiver 202 or portions thereof.

The processing systems 206, 216 of the ADS-B receiver 202 and/or the portable electronic device 204 provide processing functionality for the ADS-B system 102 or the portable electronic device 204, respectively, and may include any number of processors, micro-controllers, or other processing systems, and resident or external memory for storing data and other information received or generated by the ADS-B system 102 and/or the portable electronic device 204. The processing systems 206, 216 may execute one or more software programs or code segments which implement techniques described herein. The processing systems 206/216 are not limited by the materials from which it is formed or the processing mechanisms employed therein, and as such, may be implemented via semiconductor(s) and/or transistors (e.g., electronic integrated circuits (ICs), programmable logic devices (PLDs), application-specific integrated circuits (ASICs)), and so forth.

The memory 208 of the ADS-B receiver 202 and/or the memory 218 of the portable electronic device 204 are examples of tangible device-readable media that provide storage functionality to store various data associated with the operation of the ADS-B system 102, such as the software programs and code segments mentioned above, or other data to instruct the processing systems 206, 216 and other elements of the ADS-B system 102 to perform the steps described herein. Although the ADS-B receiver and the portable electronic device are each shown as including a single memory 208, 218, a wide variety of types and combinations of memory may be employed. The memories 208, 218 may be integral with the respective processing systems 206, 216, stand-alone memory, or a combination of both. The memory 208, 218 may include, for example, removable and non-removable memory elements such as Random Access Memory (RAM), Read Only Memory (ROM), Flash memory, magnetic memory, optical memory, and so forth.

The position determining system 210 is configured to provide position determining functionality for the ADS-B system 102. Position determining functionality, for purposes of the following discussion, may relate to a variety of different navigation techniques and other techniques that may be supported by "knowing" one or more positions of the ownship aircraft 104 (FIG. 1). For example, position determining functionality may be employed to provide location data, velocity data, acceleration data, rate of climb/descent data, heading data, and a variety of other navigation-related data for the ownship aircraft 104 to the processing system 206 of the ADS-B receiver 202 and/or the processing system 216 of the portable electronic device 204 for use by the ADS-B receiver 202 and/or the portable electronic device 204.

In embodiments, the position determining system 210 may comprise a receiver that is configured to receive signals from one or more position-transmitting sources. For example, the position determining system 210 may be configured for use with a Global Navigation Satellite System (GNSS). In embodiments, the position determining system 210 may be a Global Positioning System (GPS) receiver operable to receive navigational signals from GPS satellites and to calculate a location of the ownship aircraft 104 (FIG. 1) as a function of the signals. Other exemplary position determining systems include, but are not limited to: a Global Orbiting Navigation Satellite System (GLONASSTM™), a GALILEOTM™ navigation system, and/or other satellite or terrestrial navigation systems.

As illustrated in FIG. 2A, the position determining system 210 may be integral with the ADS-B receiver 202. However, it is contemplated that portable electronic device 204 may also include a position determining system in addition to, or in place of, the position determining system 210 shown. Moreover, in other embodiments, the position determining system 206 may be configured as one or more separate components that communicate position information with the ADS-B system 102 (e.g., with the ADS-B receiver 202 and/or the portable electronic device 204) via a wired or wireless interface. A variety of configurations are possible.

The ADS-B receiver 202 and portable electronic device 204 are further illustrated as including communication modules 212, 220, respectively. The communication modules 212, 220 are representative of communication functionality to permit sending and/or receiving of data between the ADS-B receiver 202 and the portable electronic device 204, with other devices or systems within the ownship aircraft 104, combinations thereof, and so forth. The communication modules 212, 220 may be representative of a variety of communication components and functionality including, but not limited to: one or more wires/cables, one or more antennas; a browser; a transmitter and/or receiver; a wireless radio; data ports; software interfaces and drivers; data processing components; and so forth. Communication between the communication modules 212, 220 may be by a wired or wireless interface. Examples of wired interfaces include, but are not limited to: universal serial bus (USB), Ethernet, serial connections, and so forth. Examples of wireless interfaces include, but are not limited to: networks configured for communications according to one or more standard of the Institute of Electrical and Electronics Engineers (IEEE), such as 802.11 or 802.16 (Wi-Max) standards; Wi-Fi standards promulgated by the Wi-Fi Alliance; BLUETOOTH™ standards promulgated by the Bluetooth Special Interest Group; and so on.

In FIG. 2A, the ADS-B receiver 202 is illustrated as including a receiver assembly 214. The receiver assembly 214 provides functionality to receive periodic broadcasts containing ADS-B information originating from other aircraft 108 and ATC ground stations 106 over an ADS-B data link. In FIG. 2A, the receiver assembly 214 is illustrated as including one or more receivers (e.g., two receivers 226 and 228 are shown). The receiver assembly 214 may employ any of several different data link technologies, including but not limited to: Mode-S Extended Squitter (1090 ES), Universal Access Transceiver (978 MHz UAT), and VHF data link (VDL Mode 4). For example, in the illustrated embodiment, the receiver assembly 214 may comprise a 1090 MHz receiver 226 capable of receiving transmissions from the transponders of other aircraft (e.g., aircraft 108) which may be a 1090 ES transponder and capable of receiving ground transmitted TIS-B data. The receiver assembly 214 may also comprise a 978 MHZ receiver 228 capable of receiving transmissions from the UAT ADS-B system of other aircraft (e.g., aircraft 108) and capable of receiving TIS-B transmissions from an ATC ground station 106 (FIG. 1). In various configurations, the receiver assembly 214 therefore includes dual-link functionality operable to acquire traffic and other aircraft information from several sources (e.g., 978 MHz and 1090 MHz transmissions). However, in other configurations, the receiver assembly 214 may provide only single-link functionality operable to receive traffic information from other aircraft 108 and ground sources 106 utilizing the data link.

The ADS-B system 102 may be configured to furnish ADS-B In service without any ownship corresponding ADS-B Out service. In such embodiments, the ADS-B system 102 may be capable of receiving TIS-B data as well as other ADS-B data, such as FIS-B data, and so forth, from an ATC ground station 106, and/or direct communication from nearby aircraft 108.

The receiver assembly 214 is operable to receive transmissions from the ATC ground station 106 that include air traffic information and a client list including identification addresses of aircraft included in the air traffic information. For example, in the illustrated embodiment, the 1090 MHz receiver 226 and/or a 978 MHz receiver 228 may be configured to receive TIS-B transmissions from ATC ground stations 106 (FIG. 1). The TIS-B transmissions include TIS-B air traffic information and a TIS-B service status list including the ICAO addresses of aircraft (e.g., aircraft 108) included in the TIS-B air traffic information. The identification address (e.g., the ICAO address) of the other aircraft 108 retrieved from a transmission received from other aircraft 108 is used to determine whether the aircraft 108 is included in the air traffic information (e.g., whether the aircraft 108 is included in TIS-B air traffic coverage) by comparing the identification address (e.g., the ICAO address) with the identification addresses (e.g., the ICAO addresses) in the client list (e.g., TIS-B service status list). For example, in embodiments, the processing system 206 may perform a search of the TIS-B service status list for the ICAO address of the second aircraft 108.

The ADS-B system 102 may include or be coupled with one or more displays to display information to members of the flight crew of the ownship aircraft 104 (FIG. 1). For example, as shown in FIGS. 2A and 2C, the portable electronic device 204 is illustrated as including a display 222. In embodiments, the display 222 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface, air traffic information, information about other aircraft 108, and so forth. The display 222 may be backlit via a backlight such that it may be viewed in the dark or other low-light environments.

The display 222 may further be provided with a touch screen 224 for entry of data and commands. For example, a user may operate the ADS-B system 102 by touching the touch screen 224 and/or by performing gestures on the screen 224. In some embodiments, the touch screen 224 may be a capacitive touch screen, a resistive touch screen, an infrared touch screen, combinations thereof, and the like. Either or both of the ADS-B receiver 202 and the portable electronic device 204 may further comprise one or more input/output (I/O) devices (e.g., a keypad, buttons, a wireless input device, a thumbwheel input device, a trackstick input device, and so on) in addition to, or in place of, the touch screen 224. The I/O devices may include one or more audio I/O devices, such as a microphone, speakers, and so on.

In FIG. 2A, the ADS-B system 102 is illustrated as including an air traffic snooping module 230 that is representative of functionality to determine whether the ownship aircraft 104, with which the ADS-B system 102 is associated, is physically within the coverage airspace of air traffic information broadcast by an ATC ground station 106 (see FIG. 1). In the embodiment shown, the air traffic snooping module 230 is implemented as a software application stored in memory 208 and executed by the processing system 206 of the ADS-B receiver 202. However, it is contemplated that in other embodiments, the air traffic snooping module 230 can be implemented as a software application stored in memory 218 and executed by the processing system 216 of the portable electronic device 204, or as multiple software application modules distributed between memories 208, 218 and executed by processing systems 206, 216 of both the ADS-B receiver 202 and the portable electronic device 204.

The air traffic snooping module 230 includes functionality to cause the receiver assembly 214 to receive one or more transmissions broadcast by the ATC ground station 106 (FIG. 1). The transmissions include air traffic information and a client list comprising identification addresses of aircraft, such as aircraft 108 (FIG. 1), included in the air traffic information. For example, in embodiments where ADS-B system 102 is configured receive TIS-B data broadcast from the ATC ground station 106, the air traffic snooping module 230 comprises functionality to cause the receiver assembly 214 to receive TIS-B air traffic information and a TIS-B service status list comprising International Civil Aviation Organization (ICAO) addresses of the aircraft (e.g., aircraft 108) included in the TIS-B air traffic information.

The air traffic snooping module 230 may further include functionality to cause the receiver assembly 214 to receive transmissions originating from other aircraft, such as aircraft 108, which are sufficiently near to the ownship aircraft 104 with which the ADS-B system 102 is associated. These transmissions may include an identification address configured to identify the other aircraft 108 to at least one of an ATC ground station 106, or another aircraft, such as the ownship aircraft 104. For example, the air traffic snooping module 230 may be configured to cause the receiver assembly 214 to receive transmissions broadcasted by the other aircraft 108, which include ICAO addresses, and which are within radio transmission range to the ownship aircraft 104.

The air traffic snooping module 230 includes functionality to cause the processing system 206 to determine whether the ownship aircraft 104 is within a range of a second aircraft, such as aircraft 108. In some configurations, the range may be predetermined based on the specifications of the ADS-B network. In other configurations, the range may be dynamic and based on real-time flight parameters, terrain, and/or other attributes. In embodiments, the air traffic snooping module 230 may receive a position of the ownship aircraft 104 determined by the position determining system 210. For example, the position of the ownship aircraft 104, which may include information describing the location (e.g., latitude and longitude), altitude, heading, and/or speed of the ownship aircraft 104 may be determined from a GPS receiver and/or a pressure altimeter and furnished to the processing system 206 by the position determining system 210.

The air traffic snooping module 230 may include functionality to cause the processing system 206 to compare the determined position of the ownship aircraft 104 with the positions of other aircraft 108 operating within the general vicinity of the ownship aircraft 104. In embodiments, the positions (e.g., locations (latitude and longitude), altitudes, headings, speeds, combinations thereof, and so forth) of other aircraft 108 may be included in transmissions received from those aircraft 108. Thus, the air traffic snooping module 230 may configure the processing system 206 to retrieve the positions of the aircraft 108 from the transmissions received from the aircraft 108 by the receiver assembly 214. For example, in embodiments where the other aircraft 108 are equipped with one or more Mode S transponders, the air traffic snooping module 230 may configure the processing system 206 to retrieve position information (e.g., location (latitude and longitude), altitude, heading, speed, etc.) of a second aircraft 108 from the Mode S reply transmissions broadcast by the Mode S transponder of the aircraft 108 and received by the 1090 Mhz receiver 226 of the receiver assembly 214. In other embodiments, the positions of the other aircraft 108 may also be furnished by transmissions received from other ADS-B equipment operating on the other aircraft 108 such as UAT (978 MHz) or VDL Mode 4. The position data may alternately be determined via data from the ATC ground station 106. For example, in embodiments of the ADS-B system 102 configured receive TIS-B data, the positions of the other aircraft 108 may be included in TIS-B air traffic information received from the ATC ground station 106.

When the air traffic snooping module 230 makes a determination that the ownship aircraft 104 is within a range of a second aircraft 108, the air traffic snooping module 230 causes the processing system 206 to determine whether the second aircraft 108 is included in coverage of the air traffic information transmitted by the ATC ground station 106. The air traffic snooping module 230 may include functionality to cause the processing system 206 to compare an identification address of the second aircraft 108 with the identification addresses in the client list of the air traffic information.

In embodiments of the ADS-B system 102 configured to receive TIS-B data, the air traffic snooping module 230 may cause the processing system 206 to compare the ICAO address of the second aircraft 108 with the ICAO addresses of aircraft included in the TIS-B service status list broadcast by the ATC ground station 106 to determine whether the second aircraft 108 is a TIS-B participating aircraft and is included in the broadcast TIS-B air traffic information. For example, the processing system 206 may perform a search of the TIS-B service status list for the ICAO address of the second aircraft 108. Aircraft determined to be receiving TIS-B services may be further examined by the traffic snooping module to be within an acceptable range of the ownship aircraft.

In some configurations, the processing system 206 of the ADS-B receiver 202 and the processing system 216 of the air portable electronic device 204 may be shared, integrated, or overlapping, such that the processing system 216 determines if the aircraft identification address of second aircraft 108 is within the client list. That is, in some configurations, the aircraft identification address and the client list may be provided to the portable electronic device 204 such that the air traffic snooping module 230 is at least partially executed by the portable electronic device 204.

Figure 2B:
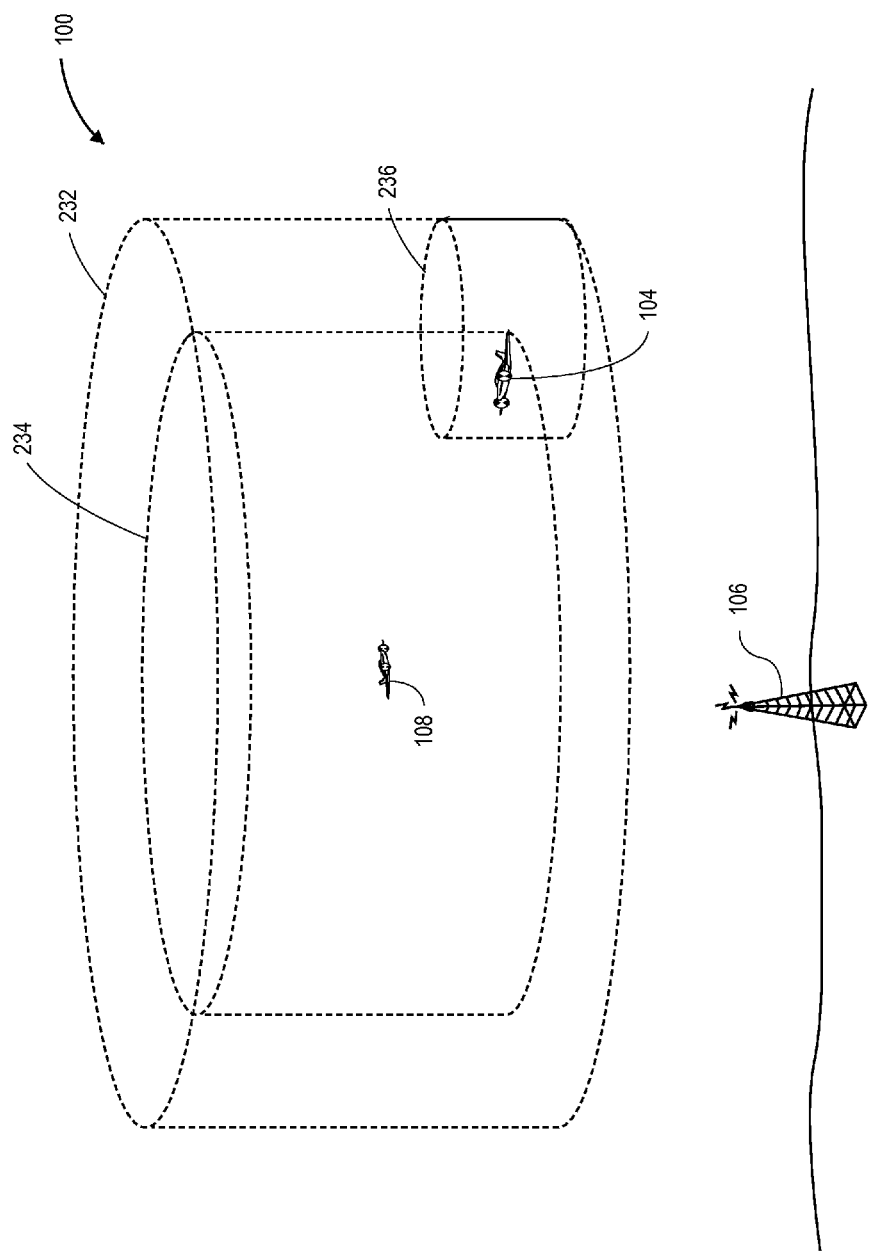
FIG. 2B is a diagrammatic illustration depicting TIS-B air traffic coverage for aircraft within an example airspace.
Figure 2C:
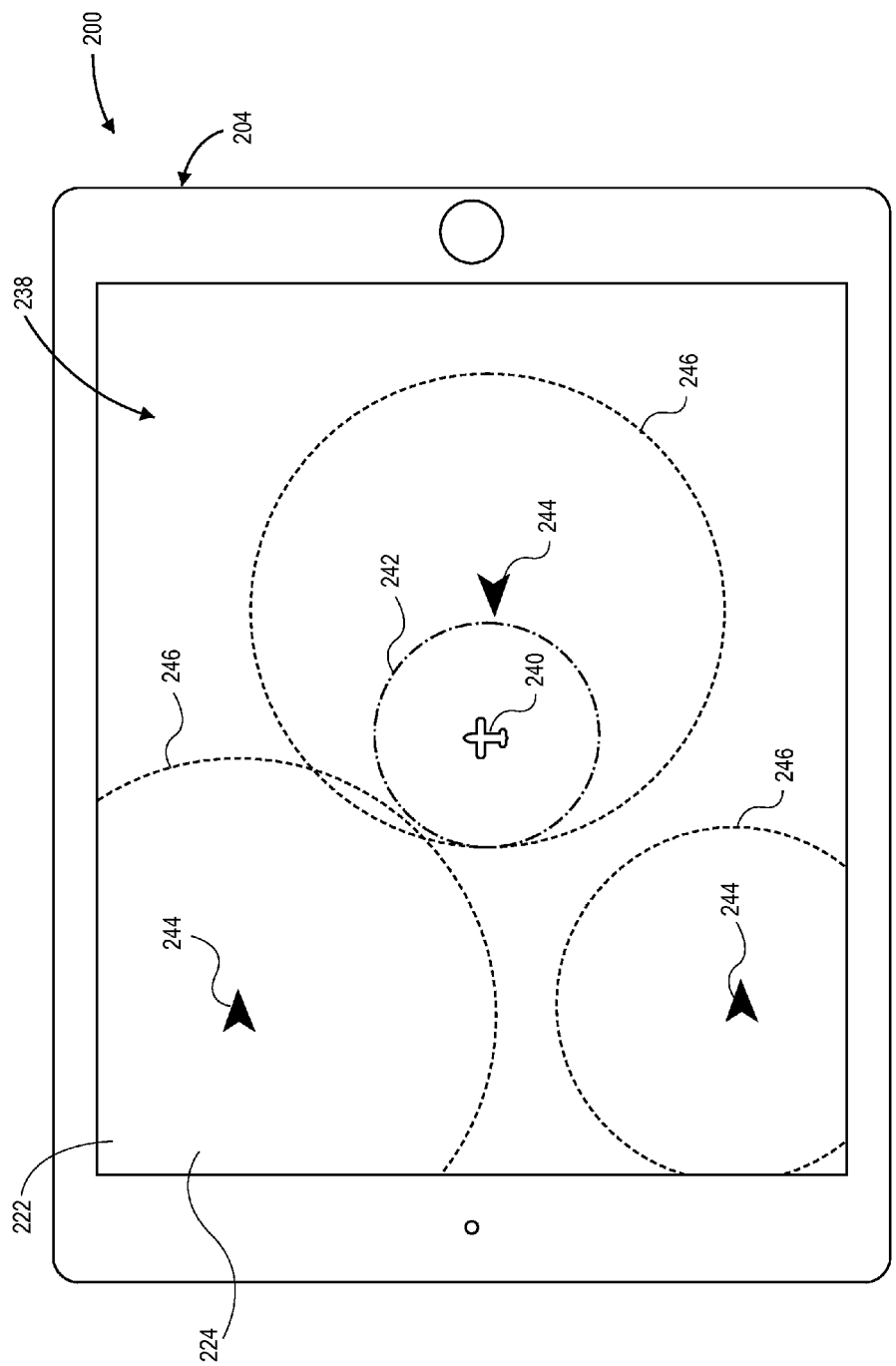
FIG. 2C is a diagrammatic illustration depicting a display of the ADS-B system shown in FIG. 2A, wherein the display is configured to furnish a graphical depiction of the air traffic coverage for the ownship aircraft.

FIG. 2B illustrates, diagrammatically, TIS-B air traffic coverage for aircraft within an example environment 100 in accordance with an example implementation of the present disclosure. As shown, the ATC ground station 106 broadcasts TIS-B air traffic information to TIS-B participating aircraft 108 that is valid within a volume of air space 232 surrounding the aircraft 108. In current TIS-B implementations, this volume of air space 232 is generally cylindrical in shape and has a radius of approximately fifteen nautical miles (15 NM) with the participating aircraft 108 at its center and an altitude range of three thousand five hundred feet (3,500 ft) above and below the participating aircraft 108. However, it is contemplated that, TIS-B air traffic information could be broadcast for a volume of airspace 232 having other shapes (e.g., spherical, ellipsoidal, toroidal, square, rectangular, combinations thereof, and so forth), and/or sizes. Further, in some configurations, the volume of the air space 232 may be dynamically calculated based on information associated with the participating aircraft 108, the ownship aircraft 104, terrain, weather conditions, and/or other attributes.

In various configurations, the air traffic snooping module 230 determines whether the ownship aircraft 104 is within a predetermined range 234 of this second (participating) aircraft 108. As shown in FIG. 2B, the predetermined range 234 may comprise a volume of airspace surrounding the participating aircraft 108 that is smaller than the volume of airspace 232 for which TIS-B air traffic information is valid. In this manner, a buffer volume of airspace 236 is created around the ownship aircraft 104 for which valid TIS-B air traffic information is available. For example, for current TIS-B implementations, the predetermined range 234 may comprise a generally cylindrical volume of airspace having a radius of twelve nautical miles (12 NM) with the participating aircraft 108 at its center and an altitude range of two thousand five hundred feet (2,500 ft) above and/or below the participating aircraft 108. In this manner, a buffer volume of airspace 236 may be provided around the ownship aircraft that has a radius of three nautical miles (3 NM) with the ownship aircraft 104 at its center and an altitude range of one thousand feet (1,000 ft) above and below the ownship aircraft 108. However, it is contemplated that, the predetermined range 234 may comprise a volume of airspace having other shapes (e.g., spherical, ellipsoidal, toroidal, square, rectangular, combinations thereof, and so forth), and/or sizes, which may correspond with the shape and size of the volume of airspace 232 surrounding the participating aircraft 108 for which TIS-B air traffic information is valid. Moreover, it is contemplated that the volumes of airspace 232 for which TIS-B air traffic information is valid surrounding multiple participating aircraft may overlap, furnishing more extensive TIS-B coverage within an airspace environment 100. For example, in airspace environments that experience high amounts of air traffic (e.g., near airports), and thus have many participating aircraft, it is contemplated that uninterrupted or substantially uninterrupted TIS-B coverage may be furnished to the aircrew of the ownship aircraft 104 by the ADS-B system 102.

The air traffic snooping module 230 includes functionality to cause the processing system 206 to furnish an indication that the ownship aircraft 104 is within coverage of the air traffic information transmitted by the ATC ground station 106 to the flight crew when the ownship aircraft 104 is within the predetermined range of the participating aircraft 108 and the participating aircraft 108 is determined to be included in the air traffic information broadcast by the ATC ground station. In embodiments, the air traffic snooping module 230 may employ a deterministic status bit that is set when the ownship aircraft 104 is determined to be within coverage of the air traffic information transmitted by the ATC ground station 106. In this manner, the air traffic snooping module 230 may cause the ADS-B system 102 to furnish an indication to the flight crew that TIS-B coverage is available and/or that TIS-B coverage is not available. The air traffic snooping module 234 may include functionality to cause the status bit to be transmitted to the portable electronic device 204 via communication modules 212, 220, to cause an indication of whether coverage is, or is not, available to be furnished by the display 222.

As shown in FIG. 2C, the air traffic snooping module 230 may configure the display 222 of the portable electronic device 204 to display a graphical depiction 238 of the air traffic coverage determined to be available and valid for the ownship aircraft 104. For example, in the embodiment shown, the ownship aircraft 104 is illustrated as being represented by a stationary aircraft icon 240 that is surrounded by a graphic (e.g., circle graphic 242), which depicts the extent of valid air traffic coverage for the aircraft 104. The positions of other aircraft 108 relative to the ownship aircraft 104 may also be represented by icons 244, while the extent of valid air traffic coverage around these aircraft 108 may be represented by additional graphics (e.g., circle graphics 246) around the respective icons 244. It is contemplated that the graphical depiction 238 may further depict other information (e.g., aircraft headings, altitudes, identifications, etc.). Moreover, it will be appreciated that the icons 240, 244 and/or graphics 242, 246 illustrated in FIG. 2C, are examples of possible icons and/or graphics that may be presented, and are not necessarily restrictive of possible indicia that can be used to represent air traffic coverage information via the display 222. Thus, the graphical depiction 238 may employ a variety of indicia including, but not limited to: icons, graphics, colors, shading, hatching, text, combinations thereof, and so forth. Moreover, it is contemplated that the indication whether TIS-B coverage is, or is not, available may be furnished in a variety of ways, such as by a light (e.g., a light emitting diode (LED) provided in the housing of the ADS-B receiver 202, and so forth).

The graphical depiction 238 enables the pilot to ascertain the position of nearby air traffic in addition to areas where valid TIS-B coverage is available. Using such information, the pilot may choose a course that provides a desired amount of TIS-B coverage. For example, the pilot may fly a course that ensures the ownship aircraft 104 is always in proximity to participating aircraft and associated TIS-B coverage. Similarly, the pilot, the electronic device 204, and/or the ADS-B system 102 may estimate when TIS-B coverage is likely to terminate—based on the positions of the participating aircraft—and provide advanced notice regardless the loss of air traffic information. For example, the electronic device 204 and/or the ADS-B system 102 may project the future paths of the ownship aircraft and the participating aircraft to determine when the ownship aircraft will be, or has been, within range of the participating aircraft. Thus, the graphical depiction 238 may indicate the position of nearby air traffic, the availability of TIS-B coverage, and/or an estimation of when TIS-B coverage may terminate or begin.

Generally, functions described herein can be implemented using software, firmware, hardware (e.g., fixed logic circuitry), manual processing, or a combination of these embodiments. The term "functionality" as used herein generally represents software, firmware, hardware, or a combination thereof. In the case of a software embodiment, for example, functionality may refer to executable instructions that perform specified tasks when executed on a processor, such as a processor of the processing system 206 of the ADS-B receiver 202 and/or the processing system 216 of the portable electronic device 204 of FIG. 2A. The program code can be stored in one or more device readable media, an example of which is the memory 208 of the ADS-B receiver 202 and/or the memory 218 of the portable electronic device 204 of FIG. 2A.

Example Procedures

Figure 3:
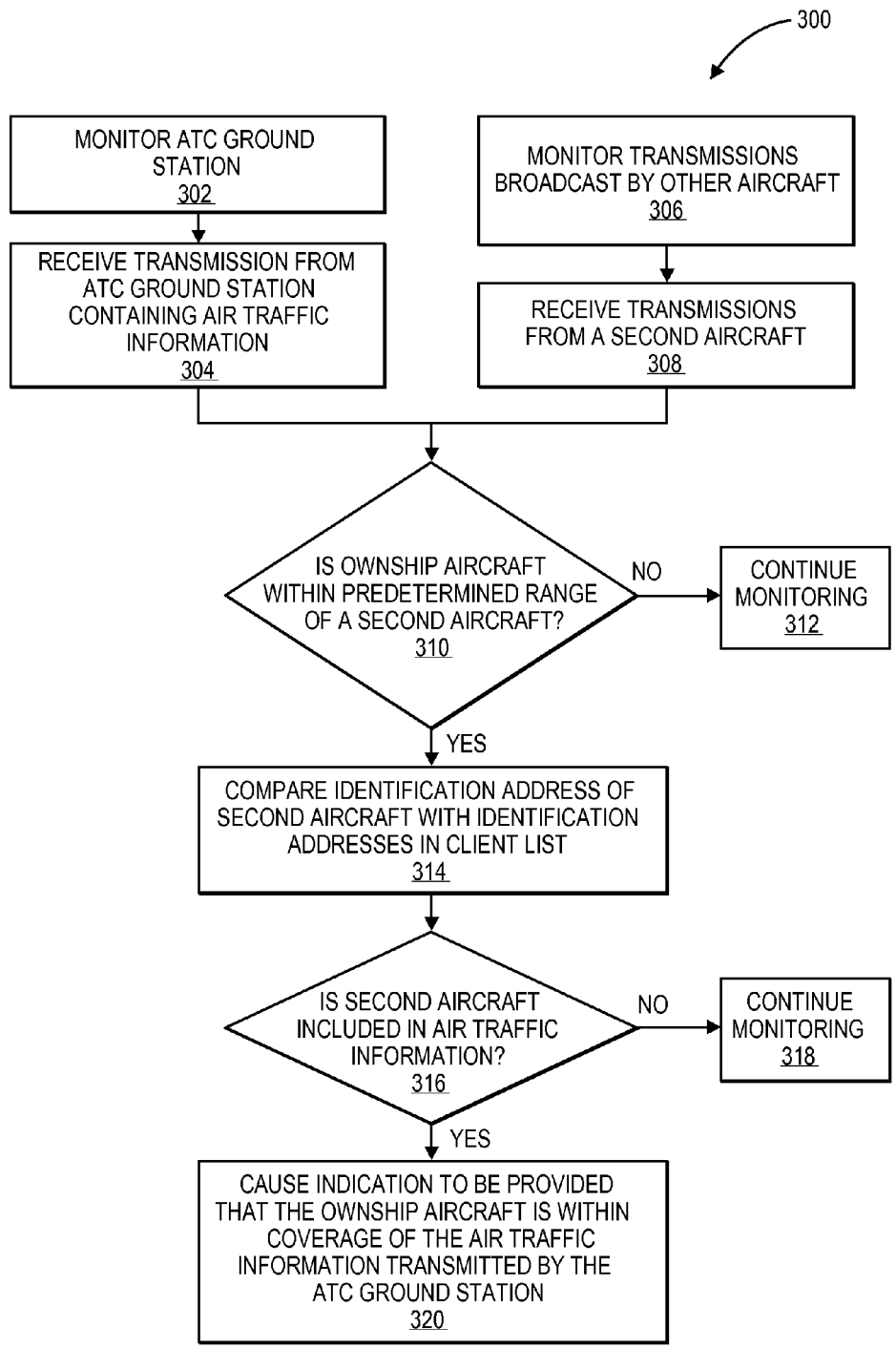
FIG. 3 is a flow diagram depicting a procedure in an example embodiment that may be implemented by an ADS-B system to furnish an indication to the flight crew of an aircraft with which the ADS-B system is associated that the aircraft is within coverage of air traffic information transmitted by an air traffic control ground station.

FIG. 3 illustrates procedures 300 (e.g., methods or processes) in an example embodiment that may be implemented by an ADS-B system to furnish an indication that an aircraft, with which the system is associated (the ownship aircraft), is within coverage of air traffic information transmitted by an ATC ground station. Aspects of the procedures 300 may be implemented in hardware, firmware, or software, or a combination thereof. The procedures 300 are shown as a set of blocks that specify operations performed by one or more devices and are not necessarily limited to the orders shown for performing the operations by the respective blocks. In portions of the following discussion, reference will be made to the environment 100 of FIG. 1 and the ADS-B system 102 of FIGS. 2A.

As shown in FIG. 3, an ATC ground station is monitored (Block 302) to receive transmissions broadcast by the ATC ground station that contain air traffic information (Block 304). For example, the receiver assembly 214 of the ADS-B receiver 202 of FIG. 2A may receive one or more transmissions broadcast by an ATC ground station 106 (FIG. 1) that include air traffic information and a client list comprising identification addresses of aircraft, such as aircraft 108 (FIG. 1), included in the air traffic information. In embodiments where ADS-B system 102 is configured receive TIS-B data broadcast by the ATC ground station 106, the receiver assembly 214 may be configured to receive TIS-B air traffic information and a TIS-B service status list comprising ICAO addresses of the aircraft (e.g., aircraft 108) included in the TIS-B air traffic information.

Transmissions broadcast by other aircraft may also be monitored (Block 306) to receive transmissions (Block 308) containing identification addresses configured to identify the other aircraft and other data about the aircrafts position. For example, the receiver assembly 214 may receive transmissions originating from other aircraft, such as aircraft 108, which are sufficiently near to the ownship aircraft 104 with which the ADS-B system 102 is associated. These transmissions include an identification address configured to identify the other aircraft 108 to at least one of the ATC ground station 106, or other aircraft, such as ownship aircraft 104. In embodiments, the receiver assembly 214 may receive transmissions broadcast by the other aircraft 108, which include ICAO addresses, and which are within transmission range to the ownship aircraft 104.

A determination is made whether the ownship aircraft is within a predetermined range of a second aircraft (Decision Block 310). In embodiments, a position of the ownship aircraft 104 may be determined by the position determining system 210. For example, the position of the ownship aircraft 104, which may include information describing the location (e.g., latitude and longitude), altitude, heading, and/or speed of the ownship aircraft 104 may be determined from a GPS receiver and/or a pressure altimeter and furnished to the processing system 206 by the position determining system 210. The determined position of the ownship aircraft 104 is compared with positions of other aircraft 108 operating within the general vicinity of the ownship aircraft 104. In embodiments, the positions (e.g., locations (latitude and longitude), altitudes, headings, speeds, combinations thereof, and so forth) of other aircraft 108 may be included in the transmissions received from those aircraft 108 (Block 308). The processing system 206 may in this manner retrieve the positions of the aircraft 108 from the transmissions received from the aircraft 108 by the receiver assembly 214. For example, in embodiments where the other aircraft 108 are equipped with one or more Mode S transponders, the processing system 206 may retrieve position information (e.g., location (latitude and longitude), altitude, heading, speed, etc.) of a second aircraft 108 from the Mode S reply transmissions broadcast by the aircraft 108 and received by the 1090 MHz receiver 226 of the receiver assembly 214. In embodiments where the other aircraft 108 are equipped with one or more UAT ADS-B systems, the processing system 206 may retrieve position information (e.g., location (latitude and longitude), altitude, heading, speed, etc.) of a second aircraft 108 from the UAT transmissions broadcast by the aircraft 108 and received by the 978 MHz receiver 228 of the receiver assembly 214. It is contemplated that a similar transmission reception technique is utilized for VDL Mode 4 or any other ADS-B data link. In other embodiments, the positions of the other aircraft 108 may be furnished by transmissions received from the ATC ground station 106. For example, in embodiments of the ADS-B system 102 configured to receive TIS-B data, the positions of the other aircraft 108 may be included in TIS-B air traffic information received from the ATC ground station 106.

As described in the discussion of FIG. 2B above, the predetermined range 234 may comprise a volume of airspace surrounding the participating aircraft 108 that is smaller than the volume of airspace 232 for which TIS-B air traffic information is valid so that a buffer volume of airspace 236 is created around the ownship aircraft 104 for which valid TIS-B air traffic information is available. For example, for current TIS-B implementations, the predetermined range 234 may comprise a generally cylindrical volume of airspace having a radius of twelve nautical miles (12 NM) with the participating aircraft 108 at its center and an altitude range of two thousand five hundred feet (2,500 ft) above and/or below the participating aircraft 108. In this manner, a buffer volume of airspace 236 may be provided around the ownship aircraft that has a radius of three nautical miles (3 NM) with the ownship aircraft 104 at its center and an altitude range of one thousand feet (1,000 ft) above and/or below the ownship aircraft 104. However, as noted, it is contemplated that the predetermined range 234 may comprise a volume of airspace having other shapes and/or sizes.

When a determination is made that the ownship aircraft is not within a predetermined range of a second aircraft ("NO" at Decision Block 310), monitoring continues (Block 312). Blocks 302-308 are repeated. When a determination is made that the ownship aircraft is within a predetermined range of a second aircraft ("YES" at Decision Block 310), the identification address of the second aircraft is compared with the identification addresses of aircraft in the client list (Block 314). For example, in embodiments of the ADS-B system 102 configured to receive TIS-B data, the processing system 206 may compare the ICAO address of the second aircraft 108 with the ICAO addresses of aircraft included in the TIS-B service status list broadcast by the ATC ground station 106 to determine whether the second aircraft 108 is a TIS-B participating aircraft and is included in the broadcast TIS-B air traffic information.

A determination is also made whether the second aircraft is included in the air traffic information broadcast by the ATC ground station (Decision Block 316). When a determination is made that the second aircraft is not included in the air traffic information broadcast by the ATC ground station ("NO" at Decision Block 316), monitoring continues (Block 318). Blocks 302-308 are repeated. When a determination is made that the second aircraft is included in the air traffic information broadcast by the ATC ground station ("YES" at Decision Block 316), an indication that the ownship aircraft is within coverage of the air traffic information transmitted by the ATC ground station is caused to be provided to the flight crew (Block 320). For example, the ADS-B receiver 202 can employ a deterministic status bit that is set when the ownship aircraft 104 is determined to be within coverage of the air traffic information transmitted by the ATC ground station 106. In this manner, the ADS-B system 102 may furnish an indication to the flight crew that TIS-B coverage is available and/or that TIS-B coverage is not available. The status bit may be transmitted to the portable electronic device 204 via communication modules 212, 220, to cause an indication of whether coverage is, or is not, available to be furnished by the display 222. Additionally, the processing systems 206 and/or 216 may configure the display 222 of the portable electronic device 204 to display a graphical depiction 238 of the air traffic coverage for the ownship aircraft 104 as described in the discussion of FIG. 2C above.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system configured to furnish an indication that an ownship aircraft is within coverage of air traffic information transmitted by an air traffic control ground station, the system comprising:
    a receiver assembly operable to receive a transmission from an air traffic control ground station, the transmission comprising air traffic information and a client list comprising identification addresses of aircraft included in the air traffic information;
    a processing system operable to: determine whether the ownship aircraft is within a range of a second aircraft; determine whether the second aircraft is included in the air traffic information by comparing an identification address of the second aircraft with the identification addresses in the client list; and cause an indication that the ownship aircraft is within coverage of the air traffic information transmitted by the air traffic control ground station.

2. The system as recited in claim 1, wherein the receiver assembly is further operable to receive a second transmission associated with the second aircraft, the second transmission including an identification address configured to identify the second aircraft.

3. The system as recited in claim 2, wherein the second transmission comprises one of a Mode S reply transmission and/or a UAT transmission.

4. The system as recited in claim 2, further comprising a position determining system operable to determine a position of the ownship aircraft, wherein the processing system is operable to compare the determined position of the ownship aircraft with a position of the second aircraft.

5. The system as recited in claim 1, wherein the receiver assembly comprises a 1090 MHz receiver.

6. The system as recited in claim 5, wherein the receiver assembly further comprises a 978 MHz receiver.

7. The system as recited in claim 1, wherein the identification address comprises an International Civil Aviation Organization (ICAO) address, the traffic information comprises Traffic Information Services-Broadcast (TIS-B) air traffic information, and the client list comprises Traffic Information Services-Broadcast (TIS-B) service status list.

8. The system as recited in claim 1, wherein the processing system is associated with a portable electronic device and the portable electronic device is operable to furnish a graphical depiction of the air traffic coverage for the ownship aircraft.

9. The system as recited in claim 1, wherein the processing system is integrated with the portable electronic device.

10. A method for furnishing an indication that an ownship aircraft is within coverage of air traffic information transmitted by an air traffic control ground station, the method comprising:
    receiving a transmission from an air traffic control ground station, the transmission comprising air traffic information and a client list comprising identification addresses of aircraft included in the air traffic information;
    determining whether the ownship aircraft is within a range of a second aircraft;
    determining whether the second aircraft is included in the air traffic information by comparing the identification address of the second aircraft with the identification addresses in the client list; and
    causing an indication to be provided that the aircraft is within coverage of the air traffic information transmitted by the air traffic control ground station when the second aircraft is determined to be included in the air traffic information and the ownship aircraft is determined to be within the range of the second aircraft.

11. The method as recited in claim 10, further comprising receiving a second transmission associated with the second aircraft, the second transmission including an identification address configured to identify the second aircraft.

12. The method as recited in claim 11, wherein the second transmission comprises one of a Mode S reply transmission and/or a UAT transmission.

13. The method as recited in claim 11, further comprising determining a position of the ownship aircraft using a position determining system, and comparing the determined position of the ownship aircraft with a position of the second aircraft.

14. The method as recited in claim 10, wherein the receiver assembly comprises a 1090 MHz receiver.

15. The method as recited in claim 14, wherein the receiver assembly further comprises a 978 MHz receiver.

16. The method as recited in claim 10, wherein the identification address comprises an International Civil Aviation Organization (ICAO) address, the traffic information comprises Traffic Information Services-Broadcast (TIS-B) air traffic information, and the client list comprises Traffic Information Services-Broadcast (TIS-B) service status list.

17. An ADS-B system configured to for operation in an ownship aircraft, the ADS-B system comprising:
 a receiver assembly operable to receive a transmission from an air traffic control ground station, the transmission comprising Traffic Information Services-Broadcast (TIS-B) air traffic information and Traffic Information Services-Broadcast (TIS-B) service status list comprising International Civil Aviation Organization (ICAO) addresses of aircraft included in the Traffic Information Services-Broadcast (TIS-B) air traffic information; and
 a processing system operable to: determine whether the ownship aircraft is within a predetermined range of a second aircraft; determine whether the second aircraft is included in Traffic Information Services-Broadcast (TIS-B) air traffic information by comparing an International Civil Aviation Organization (ICAO) address of the second aircraft with the International Civil Aviation Organization (ICAO) addresses in the Traffic Information Services-Broadcast (TIS-B) service status list; and cause an indication that the aircraft is within coverage of the Traffic Information Services-Broadcast (TIS-B) air traffic information transmitted by the air traffic control ground station to be provided when the second aircraft is included in the Traffic Information Services-Broadcast (TIS-B) air traffic information and the ownship aircraft is within the predetermined range of the second aircraft.

18. The system as recited in claim 17, wherein the receiver is further operable to receive a Mode S reply transmission associated with the second aircraft, the Mode S reply transmission including the International Civil Aviation Organization (ICAO) address of the second aircraft.

19. The system as recited in claim 18, further comprising a global navigation satellite system (GNSS) receiver operable to determine a position of the aircraft, wherein the processing system is operable to compare the determined position of the aircraft with a position of the second aircraft received from one of the transmission from the air traffic control ground station or the Mode S reply transmission associated with the second aircraft.

20. The system as recited in claim 17, wherein the receiver assembly comprises a 1090 MHz receiver.

21. The system as recited in claim 20, wherein the receiver assembly further comprises a 978 MHz receiver.

22. The system as recited in claim 17, wherein the predetermined range comprises a generally cylindrical volume of airspace having a radius of twelve nautical miles (12 NM) and an altitude range of two thousand five hundred feet (2,500 ft) above or below the second aircraft.

* * * * *